United States Patent
Orita

(10) Patent No.: US 9,209,740 B2
(45) Date of Patent: Dec. 8, 2015

(54) ACTUATING APPARATUS

(71) Applicant: HONDA MOTOR CO., LTD., Tokyo (JP)

(72) Inventor: Atsuo Orita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 219 days.

(21) Appl. No.: 14/013,513

(22) Filed: Aug. 29, 2013

(65) Prior Publication Data
US 2014/0062345 A1    Mar. 6, 2014

(30) Foreign Application Priority Data

Aug. 31, 2012  (JP) ................................. 2012-192091

(51) Int. Cl.
| | |
|---|---|
| *G05B 11/01* | (2006.01) |
| *H02P 31/00* | (2006.01) |
| *G05D 17/02* | (2006.01) |
| *B25J 9/16* | (2006.01) |

(52) U.S. Cl.
CPC .............. *H02P 31/00* (2013.01); *B25J 9/1641* (2013.01); *G05D 17/02* (2013.01); *G05B 2219/39507* (2013.01)

(58) Field of Classification Search
CPC .......................... G05B 19/39507; H02P 31/00
USPC .............. 318/15, 560, 565, 568.16, 632, 638, 318/652, 684; 474/3, 5, 18, 25, 102, 149, 474/152, 153, 166; 477/34, 37, 44, 46
See application file for complete search history.

(56) References Cited

U.S. PATENT DOCUMENTS

| | | | |
|---|---|---|---|
| 5,241,331 A * | 8/1993 | Chiku ........................... | 346/134 |
| 6,050,912 A * | 4/2000 | Kobayashi ...................... | 474/18 |
| 6,969,965 B2 * | 11/2005 | Takenaka ............. | B62D 57/032 |
| | | | 318/568.1 |
| 7,095,196 B2 * | 8/2006 | Tokunou .................. | B60K 6/44 |
| | | | 318/362 |

(Continued)

FOREIGN PATENT DOCUMENTS

| | | |
|---|---|---|
| DE | 60308416 T2 | 9/2007 |
| JP | 10-249777 | 9/1998 |

(Continued)

OTHER PUBLICATIONS

English Translation of German Office Action dated Feb. 13, 2014, 8 pages.
German Search Report and English translation dated Feb. 13, 2014, 18 pages.
Japanese Office Action dated Oct. 20, 2015, Application No. 2012-192091, partial English translation included.

* cited by examiner

*Primary Examiner* — Bentsu Ro
*Assistant Examiner* — Thai Dinh
(74) *Attorney, Agent, or Firm* — Rankin, Hill & Clark LLP

(57) ABSTRACT

An actuating apparatus includes a first pulley to which a rotational power of a motor is transmitted, a second pulley to which a rotational power of the first pulley is transmitted through a wire, displacement encoders for detecting respective rotational angles of the first pulley and the second pulley, a slip amount calculator for calculating a slip amount of the second pulley with respect to the wire, and a motor controller for controlling a torque output from the motor based on the slip amount. The slip amount calculator calculates the slip amount based on a change in a rotational angular velocity of the first pulley, a difference between the rotational angles of the first pulley and the second pulley, and the torque output from the motor.

4 Claims, 3 Drawing Sheets

(56) References Cited

U.S. PATENT DOCUMENTS

| | | | |
|---|---|---|---|
| 7,261,672 B2* | 8/2007 | Frank et al. | 477/45 |
| 7,337,040 B2* | 2/2008 | Takenaka | B25J 13/088 |
| | | | 180/8.1 |
| 8,357,063 B2* | 1/2013 | Sakaue | F16H 61/66259 |
| | | | 474/18 |
| 8,952,645 B2* | 2/2015 | Fraeger | 318/632 |
| 2008/0297094 A1* | 12/2008 | Ooga | 318/632 |
| 2012/0239198 A1 | 9/2012 | Orita et al. | |

FOREIGN PATENT DOCUMENTS

| | | |
|---|---|---|
| JP | 2004-322220 | 11/2004 |
| JP | 2010-064232 | 3/2010 |
| JP | 2011-115878 | 6/2011 |
| WO | 2004/057217 A1 | 7/2004 |
| WO | 2008/105292 | 9/2008 |

ACTUATING APPARATUS

CROSS-REFERENCE TO RELATED APPLICATION

This application is based upon and claims the benefit of priority from Japanese Patent Application No. 2012-192091 filed on Aug. 31, 2012, the contents of which are incorporated herein by reference.

BACKGROUND OF THE INVENTION

1. Field of the Invention

The present invention relates to an actuating apparatus for actuating a joint of a robot.

2. Description of the Related Art

Japanese Laid-Open Patent Publication No. 10-249777 discloses a robot arm actuating apparatus including three links, which are coupled by three joints and extend from the base of an actuating system to the distal end of a hand. The base of the actuating system has three pulleys fixed to respective actuators. Each of the joints has a joint shaft, on which there are mounted as many independently rotatable pulleys as the number of wires that are trained around the pulleys and operatively coupled to the joint. When the robot arm comes into contact with an external environment, the wires, which are trained around the pulleys and fixed to the respective actuators, slip on the pulleys, thereby preventing the robot arm from applying excessive forces to the external environment.

SUMMARY OF THE INVENTION

However, when an external force is applied to any one of the joints, the torque that actually is imposed on the joint becomes different from the torque that is applied from the actuator, e.g., a motor, to the joint. Since the actuator is controlled such that the actual applied torque is intended to serve as a target torque, the joints cannot be controlled appropriately.

It is an object of the present invention to provide an actuator apparatus, which is capable of appropriately controlling an angularly movable member such as a joint or the like, even during times that external forces are applied to the angularly movable member.

According to the present invention, there is provided an actuating apparatus comprising a rotary actuator, a coupling mechanism connected to an output side of the rotary actuator, a first member connected to an output side of the coupling mechanism, a second member connected to an angularly movable member incorporated in a joint, an elastic member for transmitting rotational power from the first member to the second member, a displacement detecting unit for detecting respective displacements of the first member and the second member, a slip amount calculator for calculating a slip amount of the second member with respect to the elastic member, and a rotation controller for controlling an output torque from the rotary actuator based on the slip amount, wherein the slip amount calculator calculates the slip amount based on a change in a rate of displacement of the first member, a difference between the respective displacements of the first member and the second member, and the output torque from the rotary actuator.

In the actuating apparatus, the slip amount calculator may calculate the slip amount according to the following equation:

$$S = I1/kr \cdot (d\theta1(n+1) - d\theta1(n))/dt + (\theta2(n) - \theta1(n)) - \tau r(n)/kr$$

where S is the slip amount, $I1$ is an inertial moment of the first member, the coupling mechanism, and the rotary actuator, $kr$ is a torsion spring constant between the first member and the second member, $\theta1(n)$ is a displacement of the first member detected at a timing n, $\theta2(n)$ is a displacement of the second member detected at the timing n, $d\theta1(n)$ is a change in the rate of displacement of the first member detected at the timing n, and $\tau r(n)$ is an output torque from the coupling mechanism detected at the timing n.

In the actuating apparatus, the slip amount calculator may perform a low-pass filtering process on the calculated slip amount in order to correct the slip amount.

In the actuating apparatus, a slip start torque at which the first member starts to slip with respect to the elastic member may be established, based on a tensile force applied to the elastic member before the rotary actuator is energized, a total length of the elastic member, a coefficient of static friction between the second member and the elastic member, a distance between the first member and the second member, respective radii of the first member and the second member, and a speed reduction ratio, including a reduction ratio of 1:1, of the coupling mechanism. The rotation controller may control the rotary actuator such that the rotary actuator outputs the torque that is less than the slip start torque.

According to the present invention, since the slip amount is calculated based on the change in the displacement rate of the first member, the difference between the displacements of the first member and the second member, and the output torque from the rotary actuator, it is possible to determine an actual torque $\tau act$, which actually is applied from the rotary actuator to the angularly movable member at the junction. Displacement of the junction can thus be controlled appropriately in terms of acceleration, speed, and position.

The slip start torque at which the first pulley 16 starts to slip on the elastic member is established, based on the tensile force applied to the elastic member before the rotary actuator is energized, the total length of the elastic member, the coefficient of static friction between the second member and the elastic member, the distance between the first member and the second member, the respective radii of the first member and the second member, and the speed reduction ratio of the coupling mechanism. The rotation controller controls the rotary actuator such that the rotary actuator will output a torque that is less than the slip start torque. Therefore, during times that the motor is energized, the first member is prevented from slipping on the elastic member.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

An actuating apparatus according to a preferred embodiment of the present invention will be described in detail below with reference to the accompanying drawings.

Figure 1:
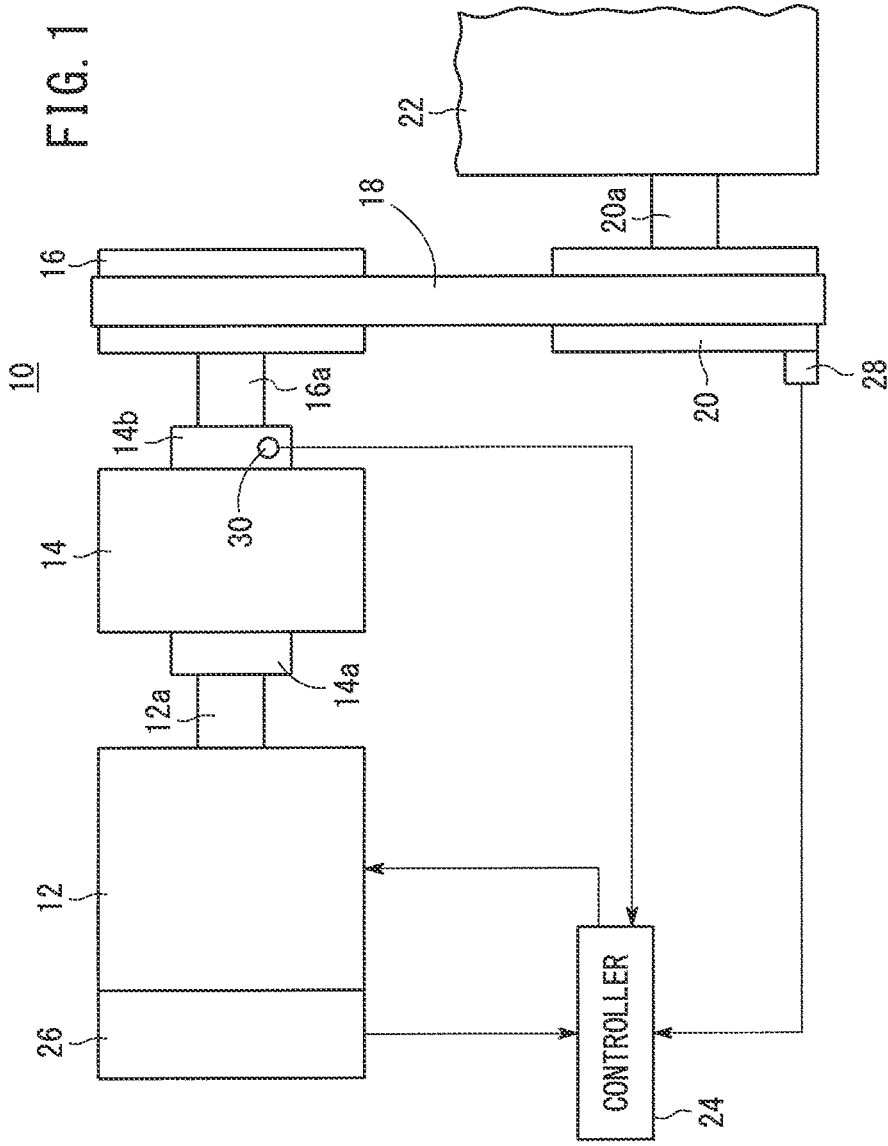
FIG. 1 is a view showing an overall structure of an actuating apparatus according to an embodiment of the present invention.

FIG. 1 shows the overall structure of an actuating apparatus 10 according to an embodiment of the present invention. As shown in FIG. 1, the actuating apparatus 10 includes a motor 12, a coupling mechanism 14, a first pulley 16, a wire 18, a second pulley 20, an angularly movable member 22, and a controller 24.

The motor 12, which serves as a rotary actuator, is an electric motor. When electric power is supplied to the motor 12 from an electric power supply, not shown, the motor 12 generates a torque for rotating an output shaft 12a (motor shaft) of the motor 12 about its axis. The coupling mechanism 14 includes an input shaft 14a coaxially connected to the output shaft 12a for rotation in unison therewith. The coupling mechanism 14 transmits rotational power input from the output shaft 12a to the input shaft 14a at a given speed reduction ratio, and outputs rotational power at the reduced speed from an output shaft 14b of the coupling mechanism. The output shaft 14b of the coupling mechanism 14 is connected to an input shaft 16a of the first pulley (first member) 16. The coupling mechanism 14 may transmit rotational power input from the input shaft 14a to the output shaft 14b without a reduction in speed, i.e., at a speed reduction ratio of 1:1. In other words, the coupling mechanism 14 may be any type of mechanism capable of transmitting rotational power from the motor 12 to the first pulley 16.

The wire 18, which comprises an annular elastic member, is trained around the first pulley 16 and the second pulley 20 for transmitting rotational power from the first pulley 16 to the second pulley 20. The second pulley 20 has an output shaft 20a to which the angularly movable member 22 is connected.

The actuating apparatus 10 is combined with a joint of a robot. If the angularly movable member 22 is incorporated in a knee joint of the robot, then the angularly movable member 22 is mounted on the lower leg of the robot, whereas the motor 12 is mounted on the thigh of the robot.

The total length and rigidity of the wire 18 as well as the radii of the first and second pulleys 16, 20 may be changed appropriately in order to change the rigidity of the joint combined with the actuating apparatus 10.

The actuating apparatus 10 also includes displacement encoders 26, 28 and a torque sensor 30. The displacement encoder (rotational angle detecting unit, displacement detecting unit) 26 detects a rotational angle (displacement) $\theta m$ of the motor 12. The displacement encoder (rotational angle detecting unit, displacement detecting unit) 28 detects a rotational angle (displacement) $\theta 2$ of the second pulley 20. The torque sensor 30 detects a torque $\tau r$ that is output by the coupling mechanism 14. The displacement encoder 26, the displacement encoder 28, and the torque sensor 30 output respective signals (values) to the controller 24, which represent the detected rotational angle $\theta m$, the detected rotational angle $\theta 2$, and the detected torque $\tau r$.

The torque sensor 30 may be combined with the motor 12 in order to detect an output torque $\tau m$ output from the motor 12. The detected output torque $\tau m$ output from the motor 12 may be multiplied by the speed reduction ratio of the coupling mechanism 14, so as to calculate the torque $\tau r$ output by the coupling mechanism 14. Alternatively, a current sensor, not shown, may additionally be provided in order to detect a current that is supplied from the controller 24 to the motor 12. The current detected by the current sensor may be multiplied by a torque constant, i.e., the coefficient of an output torque generated by the supplied current, so as to calculate the output torque $\tau m$ output from the motor 12.

Figure 2:
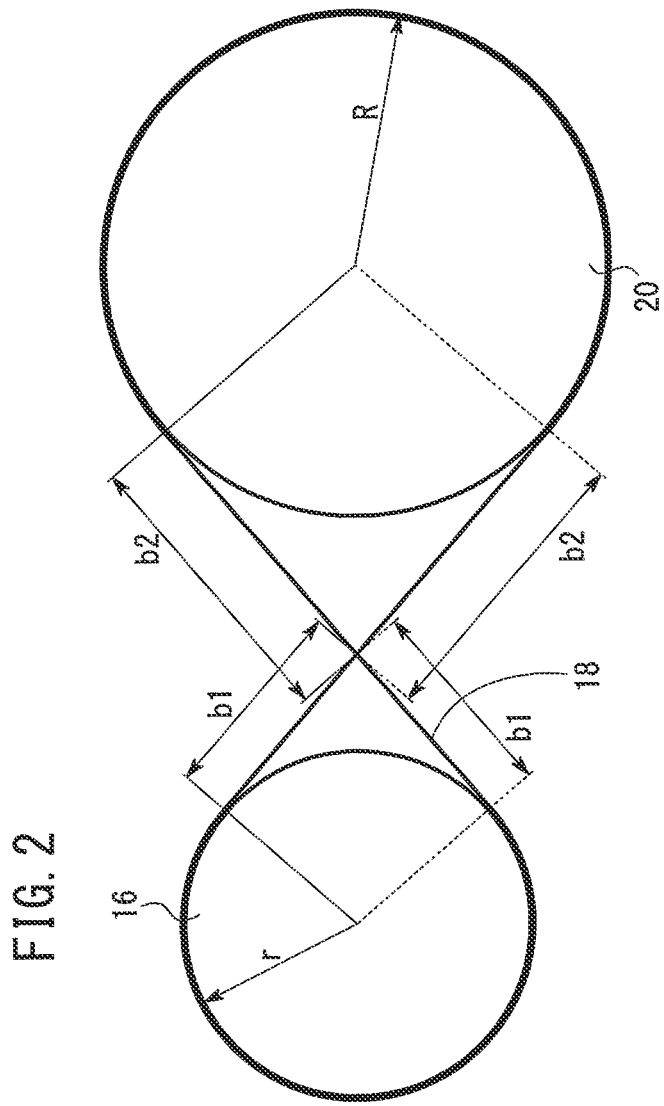
FIG. 2 is a schematic diagram showing the manner in which a level of mechanical strength required for a wire is established.

FIG. 2 is a schematic diagram showing the manner in which a level of mechanical strength required for the wire 18 is established. It is assumed that the first pulley 16 has a radius r (m), the second pulley has a radius R (m), and the wire 18 has a total length (full circumferential length) L (m). The wire 18 is trained in a crossed shape around the first pulley 16 and the second pulley 20. As will be discussed in relation to the equation shown below, b1 represents a distance from the point at which the wire 18 crosses itself between the first and second pulleys 16, 20 to a tangent point where the wire 18 is tangential to the first pulley 16, and b2 represents a distance from the point at which the wire 18 crosses itself between the first and second pulleys 16, 20 to a tangent point where the wire 18 is tangential to the second pulley 20. Further, although in FIG. 2, the wire 18 is shown as being trained in a crossed shape around the first pulley 16 and the second pulley 20, the wire 18 may also be trained in an annular shape around the first pulley 16 and the second pulley 20.

It is assumed that when a torque is applied to rotate the first pulley 16, the second pulley 20 starts to slip on the wire 18 at a certain torque (slip start torque) Ts. A tensile force Ts/R (N) is applied to the wire 18 when the slip start torque Ts is applied to the second pulley 20. Also, a coefficient of static friction $\mu$ exists between the wire 18 and the second pulley 20 at the time that the wire 18 is trained fully circumferentially around the second pulley 20. A tensile force Fp, which is applied to the wire 18 before the first pulley 16 is actuated, is expressed by the following equation:

$$Fp = L \cdot Ts \cdot 1/(2 \cdot R \cdot \mu \cdot (L - 2(b1 + b2)))$$

where "·" represents multiplication. Therefore, the wire 18 needs to have a certain level of mechanical strength, which is large enough to prevent the wire 18 from becoming broken while a tensile force of Ts/R+Fp is being applied to the wire 18.

The slip start torque Ts can be determined from the above equation based on the tensile force Fp, the total length L of the wire 18, the coefficient of static friction $\mu$, the distance between the first pulley 16 and the second pulley 20, and the radius R of the second pulley 20. Since a slip start torque Ts1 at which the first pulley 16 starts to slip on the wire 18 can be expressed by Ts1=Ts·R/(r×the speed reduction ratio of the coupling mechanism 14), by ensuring that the output torque of the motor 12 remains less than Ts1, the first pulley 16 can be prevented from slipping on the wire 18.

In FIG. 2, the radius r of the first pulley 16 is shown as being smaller than the radius R of the second pulley 20. However, the first pulley 16 and the second pulley 20 will be described below as having the same radius.

When a force from an external source (external force) is applied to the angularly movable member 22, as the second pulley 20 slips on the wire 18, the torque that actually is applied to the angularly movable member 22, i.e., the torque applied to the angularly movable member 22 that is calculated based on the difference between respective rotational angles of the first pulley 16 and the second pulley 20, is represented by the sum of the external force and an actual torque $\tau act$, which is transmitted from the motor 12 to the angularly movable member 22. Consequently, the actual torque $\tau act$ that is transmitted from the motor 12 to the angularly movable member 22 cannot be controlled so as to be equal to the target torque $\tau ref$.

The controller 24 determines an amount of slippage (slip amount S), and controls the motor 12 in order to make the torque transmitted to the angularly movable member 22 equal to the target torque $\tau ref$, by estimating an actual torque $\tau act$ that is transmitted from the motor 12 to the angularly movable member 22. In the present embodiment, inasmuch as the controller 24 controls the motor 12 to generate a torque that prevents the first pulley 16 from slipping on the wire 18, in principle, the first pulley 16 does not slip on the wire 18.

A process of calculating the slip amount S will be described below. The equation of motion for the first pulley 16 is expressed as follows:

$$\alpha 1 = \tau 1 / I1 \quad (1)$$

where α1 is a rotational angular acceleration of the first pulley 16, τ1 is the torque applied to the first pulley 16, and I1 is a moment of inertia of the first pulley 16, the coupling mechanism 14, and the motor 12.

The rotational angular accelerational α1 is expressed as follows:

$$\alpha 1 = (d\theta 1(n+1) - d\theta 1(n))/dt \quad (2)$$

where θ1(n+1) is a rotational angle (displacement) of the first pulley 16, which is detected at a timing (n+1) (e.g., a present detection timing), θ1(n) is a rotational angle (displacement) of the first pulley 16, which is detected at a timing n (e.g., a preceding detection timing), and dt is a sampling time. Therefore, dθ1(n+1) represents the rotational angular velocity (displacement rate) of the first pulley 16 at the timing (n+1), whereas dθ1(n) represents the rotational angular velocity (displacement rate) of the first pulley 16 at the timing n.

The rotational angular acceleration dθ1(n+1) is expressed by the equation dθ1(n+1)=(θ1(n+1)-θ1(n))/dt, and the rotational angular velocity dθ1(n) is expressed by the equation dθ1(n)=(θ1(n)-θ1(n-1))/dt.

The rotational angle θ1 of the first pulley 16 is determined by dividing the rotational angle θm of the motor 12, which is detected by the displacement encoder 26, by the speed reduction ratio of the coupling mechanism 14. The rotational angular velocity dθ1 of the first pulley 16 is determined by differentiating the rotational angle θ1 of the first pulley 16.

The torque τ1 equals the sum of the torque τr, which is applied from the coupling mechanism 14 to the first pulley 16, and the torque that is applied from the second pulley 20 to the first pulley 16. Taking into account the slip amount S of the second pulley 20, the torque τ1 is expressed as follows:

$$\tau 1 = kr \cdot (\theta 1(n) - (\theta 2(n) - S)) + \tau r(n) \quad (3)$$

where kr is a torsion spring constant (N·m/rad) between the first pulley 16 and the second pulley 20, which is representative of the rigidity of the joint, θ2 (n) is a rotational angle of the second pulley 20, which is detected at the timing n, and τr(n) is a torque from the coupling mechanism 14, which is detected at the timing n. The rotational angle θ2 of the second pulley 20 is detected by the displacement encoder 28.

From the above equations (1), (2), and (3), the slip amount S is determined according to the following equation (4):

$$S = I1/kr \cdot (d\theta 1(n+1) - d\theta 1(n))/dt + (\theta 2(n) - \theta 1(n)) - \tau r(n)/kr \quad (4)$$

The first term "dθ1(n+1)–dθ1(n))/dt" of equation (4) represents a change in the rotational angular velocity dθ1 of the first pulley 16, i.e., a rotational angular acceleration (displacement acceleration) α. The second term "θ2(n)–θ1(n)" represents the difference between the rotational angles (displacement difference) of the first pulley 16 and the second pulley 20, and the third term "τr(n)" represents the torque output from the coupling mechanism 14. Consequently, the slip amount S varies depending on the change in the rotational angular velocity dθ1 of the first pulley 16, the difference between the rotational angles of the first pulley 16 and the second pulley 20, and the torque output τr from the coupling mechanism 14, i.e., the output torque τm of the motor 12.

If the second pulley 20 slips on the wire 18 under an external force, which is applied to the angularly movable member 22 due to a disturbance, then the rotational angular velocity dθ1 of the first pulley 16 as well as the torque τr remain essentially unchanged. Therefore, the difference between the rotational angles of the first pulley 16 and the second pulley 20 changes primarily in a low frequency range.

Slippage of the first pulley 16 against the wire 18 implies that the motor 12 is controlled in order to generate a force in excess of a limiting static friction. If the limiting static friction is known, then it is possible to control the motor 12 such that the first pulley 16 will not slip. As described above, the first pulley 16 is controlled so as not to slip in principle. However, since the motor 12 and the first pulley 16 are operatively coupled to each other through the coupling mechanism 14, the first pulley 16 may slip slightly on the wire 18 due to mechanical characteristics (e.g., backlash) of the coupling mechanism 14. If the first pulley 16 slips on the wire 18, changes in the rotational angular velocity dθ1 of the first pulley 16 and the torque τr occur at high frequencies, whereas the difference between the rotational angles of the first pulley 16 and the second pulley 20 changes at a medium frequency. The displacement encoder 28, which is a sensor required to calculate the slip amount S, is poor in resolution, and is unable to detect displacements that change at high frequencies. Therefore, according to the present embodiment, the slip amount S, which is calculated according to equation (4), is corrected by a low-pass filtering process.

Figure 3:
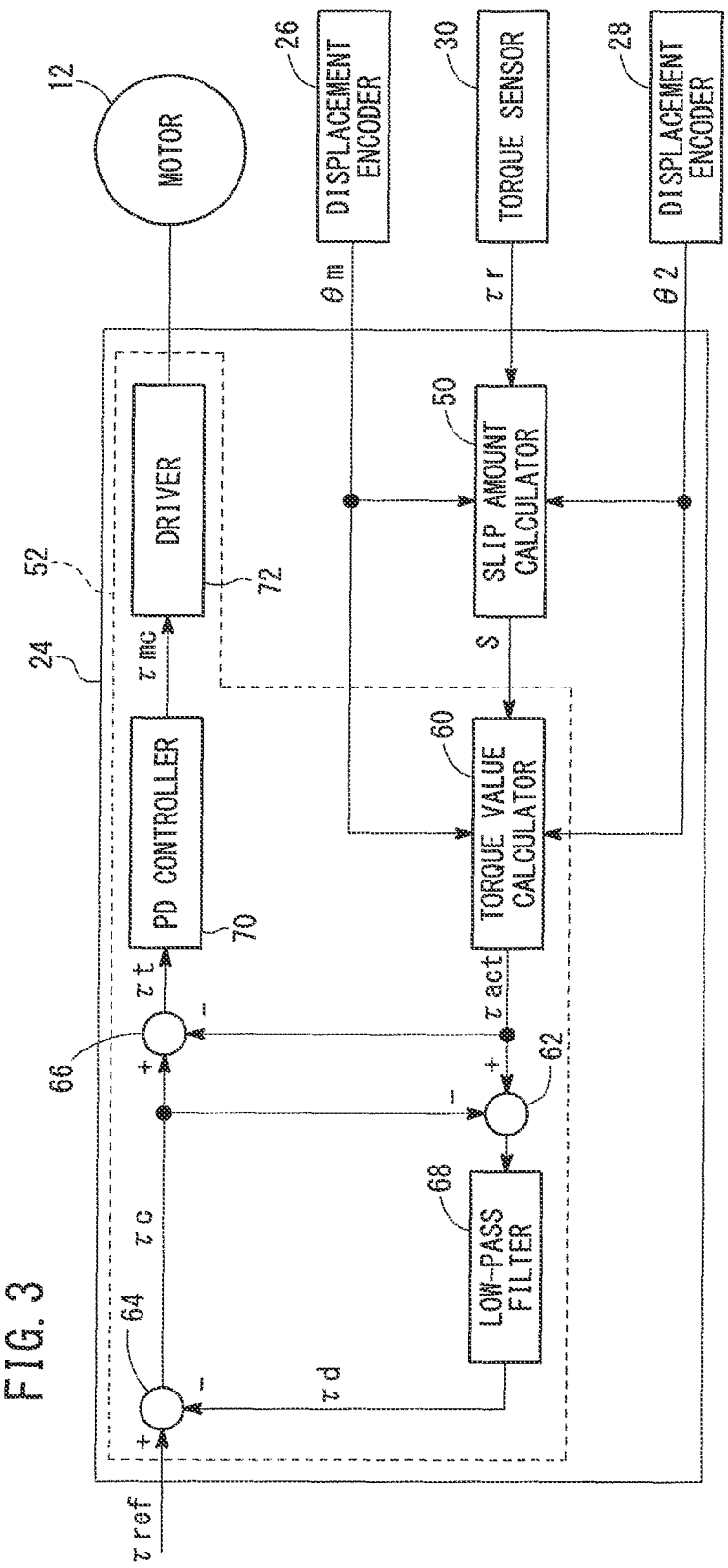
FIG. 3 is an electric block diagram of a controller of the actuating apparatus.

FIG. 3 is an electric block diagram of the controller 24. The controller 24 basically includes a slip amount calculator 50 and a motor controller (rotation controller) 52. The motor controller 52 includes a torque value calculator 60, operators 62, 64, and 66, a low-pass filter 68, a PD controller 70, and a driver 72. Successive values of the target torque τref are supplied to the controller 24. The successive values of the target torque τref are applied from the motor 12 to the angularly movable member 22 from a non-illustrated external control apparatus.

The slip amount calculator 50 calculates (estimates) a slip amount S according to equation (4) from the rotational angle θm of the motor 12, which is detected by the displacement encoder 26, the rotational angle θ2 of the second pulley 20, which is detected by the displacement encoder 28, and the torque τr, which is detected by the torque sensor 30. The slip amount calculator 50 then performs a low-pass filtering process on the calculated slip amount S, thereby correcting the slip amount S. The rotational angle θ1 of the first pulley 16 is determined by dividing the rotational angle θm of the motor 12, which is detected by the displacement encoder 26, by the speed reduction ratio of the coupling mechanism 14.

The torque value calculator 60 calculates (estimates) an actual torque τact applied from the motor 12 to the angularly movable member 22, i.e., the second pulley 20, from the rotational angle θ1 of the first pulley 16, the rotational angle θ2 of the second pulley 20, and the slip amount S. The actual torque τact may be determined according to the equation τact=kr·(θ2−θ1−S). As described above, an actual torque τact applied from the motor 12 to the angularly movable member 22 can be determined (estimated) by removing the slip amount S, which occurs when an external force is applied to the angularly movable member 22, from (θ2−θ1).

The operator 62 calculates the difference (τact−τc) between the actual torque τact calculated by the torque value calculator 60 and a torque τc, which is described in the next paragraph. The low-pass filter 68 performs a low-pass filtering process on the difference (τact−τc), thereby extracting a disturbance torque τd.

The operator 64 calculates the torque τc (τc=τref−τd), which represents the difference between the target torque τref applied from the motor 12 to the angularly movable member 22 and the disturbance torque τd. The calculated torque τc is supplied to the operators 62, 66.

The operator 66 calculates a differential torque τt (τt=τc−τact), which represents the difference between the torque τc and the actual torque τact. The PD controller 70 calculates a demand torque τmc for the motor 12 based on the differential torque τt according to a PD (Proportional plus Derivative) control process, and outputs the demand torque τmc to the driver 72. The driver 72 then energizes the motor 12 based on the demand torque τmc.

Therefore, using the slip amount S, the motor controller 52 can control the motor 12 to make the actual torque τact applied from the motor 12 to the angularly movable member 22 equal to the target torque τref. The target torque τref is set to a torque that is less than the slip start torque Ts1.

Since the slip amount S is estimated based on a change in the rotational angle θ1 of the first pulley 16, the rotational angle difference (θ2−θ1) between the first pulley 16 and the second pulley 20, and the output torque τm of the motor 12, it is possible to estimate the actual torque τact that actually is applied from the motor 12 to the angularly movable member 22 at the junction. Thus, the angular movement of the angularly movable member 22 at the junction can be controlled appropriately in terms of acceleration, speed, and position.

The slip start torque Ts1 at which the first pulley 16 starts to slip on the wire 18 is established based on the tensile force Fp applied to the wire 18 before the motor 12 is energized, the total length L of the wire 18, the coefficient of static friction μ between the second pulley 20 and the wire 18, the distance between the first pulley 16 and the second pulley 20, the respective radii r, R of the first pulley 16 and the second pulley 20, and the speed reduction ratio of the coupling mechanism 14. The motor controller 52 controls the motor 12 such that the motor 12 will output a torque that is less than the slip start torque Ts1. Therefore, the first pulley 16 can be prevented from slipping on the wire 18 when the motor 12 is energized.

In the above embodiment, the slip amount calculator 50 performs a low-pass filtering process on the slip amount S, which is calculated according to equation (4). However, the slip amount calculator 50 need not necessarily perform a low-pass filtering process on the slip amount S, which is calculated according to equation (4), in view of the fact that the slip amount S essentially refers to the amount of slippage of the second pulley 20 on the wire 18. Also, the torque τr and the rotational angular velocity dθ1 of the first pulley 16 essentially remain unchanged, so that the difference between the respective rotational angles of the first pulley 16 and the second pulley 20 changes primarily within a low frequency range.

In the above embodiment, the first member, which serves as the first pulley 16, and the second member, which serves as the second pulley 20, undergo rotary motion. However, the first member and the second member may also be moved linearly. If the first member and the second member undergo linear motion, the rotational power generated by the motor 12 is converted into linear power, which is transmitted to the first member. Such a linear-motion actuating apparatus offers the same advantages as the actuating apparatus that undergoes rotary motion according to the illustrated embodiment.

Although a preferred embodiment of the present invention has been shown and described in detail above, the present invention is not limited to the illustrated details. It will be obvious to those skilled in the art that various changes and modifications may be made to the embodiment while still remaining within the scope of the invention as set forth in the appended claims.

What is claimed is:

1. An actuating apparatus comprising:
   a rotary actuator;
   a coupling mechanism connected to an output side of the rotary actuator;
   a first member connected to an output side of the coupling mechanism;
   a second member connected to an angularly movable member incorporated in a joint;
   an elastic member for transmitting rotational power from the first member to the second member;
   a displacement detecting unit for detecting respective displacements of the first member and the second member;
   a slip amount calculator for calculating a slip amount of the second member with respect to the elastic member; and
   a rotation controller for controlling an output torque from the rotary actuator based on the slip amount,
   wherein the slip amount calculator calculates the slip amount based on a change in a rate of displacement of the first member, a difference between the respective displacements of the first member and the second member, and the output torque from the rotary actuator.

2. The actuating apparatus according to claim 1, wherein the slip amount calculator calculates the slip amount according to the following equation:

$$S = I1/kr \cdot (d\theta1(n+1) - d\theta1(n))/dt + (\theta2(n) - \theta1(n)) - \tau r(n)/kr$$

where S is the slip amount, I1 is an inertial moment of the first member, the coupling mechanism, and the rotary actuator, kr is a torsion spring constant between the first member and the second member, θ1(n) is a displacement of the first member detected at a timing n, θ2(n) is a displacement of the second member detected at the timing n, dθ1(n) is a change in the rate of displacement of the first member detected at the timing n, and τr(n) is an output torque from the coupling mechanism detected at the timing n.

3. The actuating apparatus according to claim 2, wherein the slip amount calculator performs a low-pass filtering process on the calculated slip amount in order to correct the slip amount.

4. The actuating apparatus according to claim 1, wherein a slip start torque at which the first member starts to slip with respect to the elastic member is established, based on a tensile force applied to the elastic member before the rotary actuator is energized, a total length of the elastic member, a coefficient of static friction between the second member and the elastic member, a distance between the first member and the second member, respective radii of the first member and the second member, and a speed reduction ratio, including a reduction ratio of 1:1, of the coupling mechanism; and
   the rotation controller controls the rotary actuator such that the rotary actuator outputs the torque that is less than the slip start torque.

* * * * *